(12) United States Patent
Scherngell et al.

(10) Patent No.: US 6,523,345 B2
(45) Date of Patent: Feb. 25, 2003

(54) CONTROL SYSTEM FOR A VARIABLE-GEOMETRY TURBOCHARGER

(75) Inventors: Guenther Scherngell, Breganz (AT); Werner Zaehner, Rehetobel (CH); Juerg Spuler, Neukirch (CH)

(73) Assignee: Iveco Notorenforschung AG, Schlassagasse (CH)

( * ) Notice: Subject to any disclaimer, the term of this patent is extended or adjusted under 35 U.S.C. 154(b) by 0 days.

(21) Appl. No.: 10/034,781

(22) Filed: Dec. 28, 2001

(65) Prior Publication Data

US 2002/0157395 A1 Oct. 31, 2002

(30) Foreign Application Priority Data

Jan. 19, 2001 (IT) .......................... TO01A0041

(51) Int. Cl.[7] .............................................. F02D 23/00
(52) U.S. Cl. ........................... 60/602; 60/605.1; 60/614
(58) Field of Search ................................ 60/602, 605.1, 60/605.2, 614, 615, 600, 603

(56) References Cited

U.S. PATENT DOCUMENTS

| | | | | |
|---|---|---|---|---|
| 5,123,246 A | * | 6/1992 | Younessi et al. | 60/602 |
| 5,867,986 A | * | 2/1999 | Buratti et al. | 60/602 |
| 6,067,800 A | * | 5/2000 | Kolmanovsky et al. | 60/602 |
| 6,134,890 A | | 10/2000 | Church et al | |
| 6,247,311 B1 | * | 6/2001 | Itoyama et al. | 60/602 |

FOREIGN PATENT DOCUMENTS

| | | |
|---|---|---|
| EP | 0 559 321 A1 | 6/1994 |
| WO | 97 45633 A | 12/1997 |

* cited by examiner

*Primary Examiner*—Hoang Nguyen
(74) *Attorney, Agent, or Firm*—Pearne & Gordon LLP

(57) ABSTRACT

A control system for a variable-geometry turbocharger connected to an internal combustion engine, whereby the geometry of the turbocharger is controlled alternatively according to a first operating mode, a second operating mode or a third operating mode; the system providing for switching from one operating mode to another fully automatically.

19 Claims, 2 Drawing Sheets

CONTROL SYSTEM FOR A VARIABLE-GEOMETRY TURBOCHARGER

The present invention relates to a control system for a variable-geometry turbocharger.

SUMMARY OF THE INVENTION

In particular, it is an object of the present invention to provide a control system for controlling a variable-geometry turbocharger according to different operating modes, and for ensuring efficient control of the turbocharger in each mode.

According to the present invention, there is provided a control system for a variable-geometry turbocharger, of the type described in claim 1.

BRIEF DESCRIPTION OF THE DRAWINGS

A preferred, non-limiting embodiment of the invention will be described by way of example with reference to the accompanying drawings, in which:

FIG. 1a shows an evolutive control system;

DETAILED DESCRIPTION OF THE INVENTION

Figure 1:
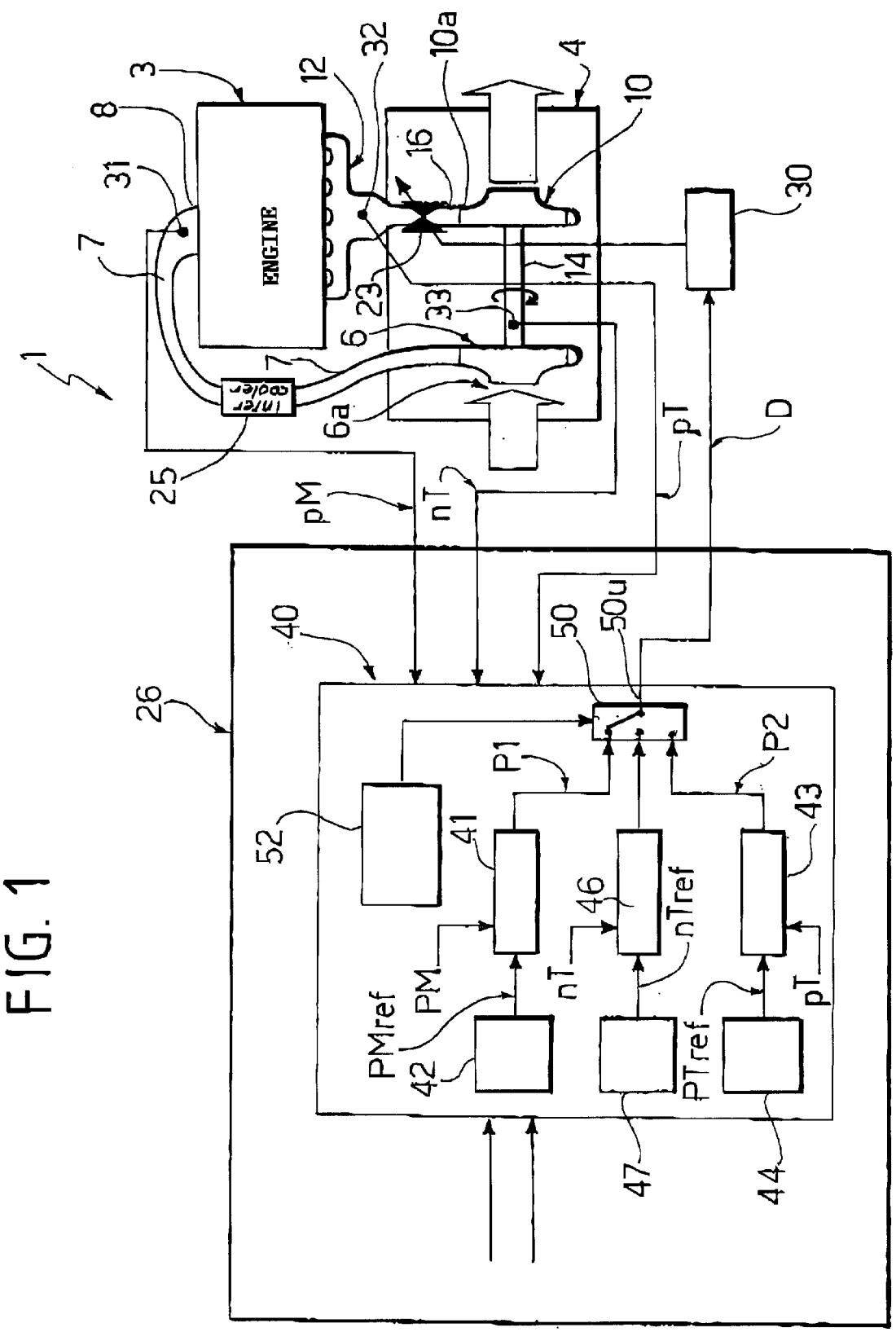
FIG. 1 shows a control system for a variable-geometry turbocharger, in accordance with the teachings of the present invention.

Number 1 in FIG. 1 indicates as a whole a control system for a variable-geometry turbocharger.

System 1 is applied to an internal combustion engine 3 (shown schematically)—e.g. a diesel or petrol engine—equipped with a variable-geometry turbocharger 4.

More specifically, turbocharger 4 comprises a compressor 6 having an air inlet 6a and which feeds compressed air to an output conduit 7 extending between compressor 6 and an intake manifold 8 of internal combustion engine 3. Turbocharger 4 also comprises a turbine 10 driven by the exhaust gas from an exhaust manifold 12 of engine 3 and connected mechanically to compressor 6 by a shaft 14. More specifically, a supply conduit 16 extends between exhaust manifold 12 and a supply inlet 10a of turbine 10; conduit 16 has a device 23 for controlling the variable-geometry turbocharger, and which varies the section of conduit 16 to alter the geometry of the turbocharger and so vary the speed of the gas supplied to the impeller (not shown) of turbine 10; and output conduit 7 is fitted with a device (intercooler) 25 for cooling the compressed air supplied to engine 3.

The control system according to the present invention is implemented in an electronic central control unit 26, which receives information signals pM, pT, nT and supplies a drive signal D for an actuator 30 of control device 23 of the variable-geometry turbocharger.

More specifically, the information signals supplied to central control unit 26 comprise;

a first signal pM related to the air flow supplied to the intake of the engine 3. In the embodiment shown, the first signal pM corresponds to the supply pressure (boost pressure) of the compressed air supplied to engine 3 by compressor 6 (signal pM is conveniently generated by a pressure sensor 31 inside output conduit 7). It is however clear that different signals pM may be used, for instance a temperature corrected supply pressure or a signal directly correlated to the mass flow of the compressed air.

a second signal pT proportional to the pressure (preturbine pressure) of the exhaust gas supplied by exhaust manifold 12 to turbine 10 (signal pT is conveniently generated by a pressure sensor 32 inside exhaust manifold 12); and a third signal nT proportional to the rotation speed (revolutions per second) of turbocharger 4 (signal nT is conveniently generated by a rotation sensor 33 associated with shaft 14).

Electronic central control unit 26 comprises, among other things, a control unit 40 for controlling the variable-geometry turbocharger, and in turn comprising:

a (known) first controller 41 for controlling turbocharger 4, and which receives at least one reference input signal pMref (supplied, for example, by a map 42) together with first signal pM, and generates a first closed-loop drive signal P1 for actuator 30;

a (known) second controller 43 for controlling turbocharger 4, and which receives at least one reference input signal pTref (supplied, for example, by a map 44) together with second signal pT, and generates a second closed-loop drive signal P2 for actuator 30; and a (known) third controller 46 for controlling turbocharger 4, and which receives at least one reference input signal nTref (supplied, for example, by a map 47) together with third signal nT, and generates a third closed-loop drive signal P3 for actuator 30.

More specifically, the outputs of first controller 41, second controller 43 and third controller 46 are connected respectively to a first, second and third input of a selecting device 50, the output 50u of which is connected to actuator 30 for controlling variable-geometry turbocharger 4 by means of the drive signal. Selecting device 50 is controlled by a logic control circuit 52, which connects output 50u to the first, second or third input to permit control of variable-geometry turbocharger 4 by first controller 41, second controller 43 or third controller 46.

First map 42, second map 44 and third map 47 may receive input signals correlated to the speed and fuelling (or load) of engine 3.

Figure 2:
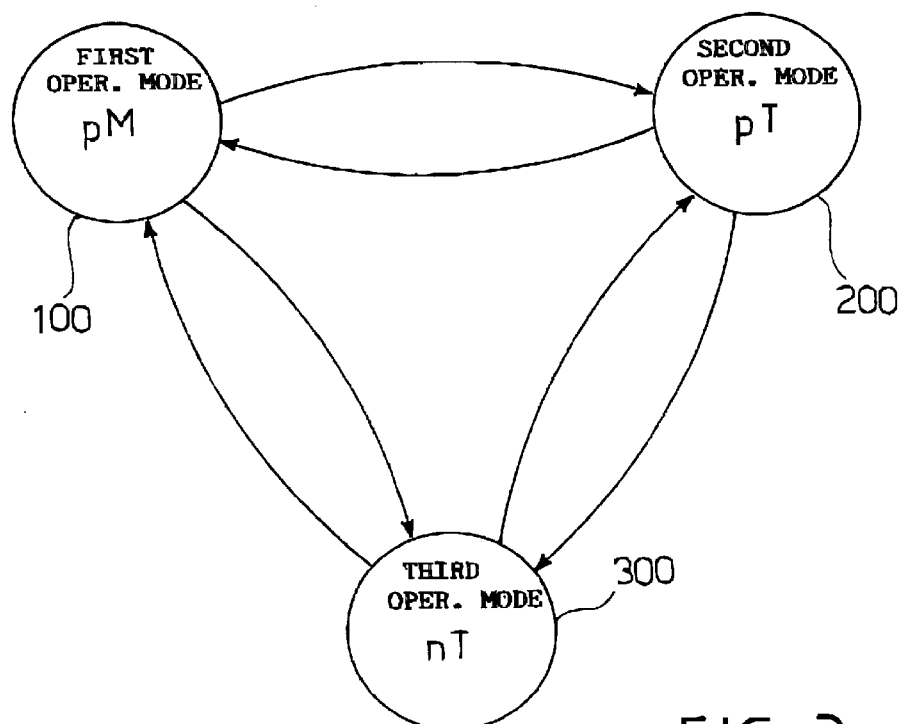
FIG. 2 shows operating stages relative to a basic control logic of the system according to the present invention.

FIG. 2 shows a logic operating diagram of logic circuit 52. In FIG. 2:

block 100 indicates a first operating mode, in which the first input of selecting device 50 is connected to output 50u, and variable-geometry turbocharger 4 is controlled solely by first controller 41;

block 200 indicates a second operating mode, in which the second input of selecting device 50 is connected to output 50u, and variable-geometry turbocharger 4 is controlled solely by second controller 43; and block 300 indicates a third operating mode, in which the third input of selecting device 50 is connected to output 50u, and variable-geometry turbocharger 4 is controlled solely by third controller 46.

According to the present invention, only one controller at a time (first 41, second 43 or third 46) takes over control of variable-geometry turbocharger 4, and control is switched from one controller to another fully automatically.

The switch from the first to the second operating mode (from block 100 to block 200) is made when at least one of the following conditions is determined:

signal pT reaches a limit threshold value pTlim and signal nT does not exceed a limit value nTlim;

the engine is in a transient state and signal nT does not exceed a threshold value nTlim.

The switch from the second to the first operating mode (from block 200 to block 100) is made when the following condition is determined:

signal pM is close to a reference value pMref and signal nT does not exceed threshold value nTlim.

The switch from the first to the third operating mode (from block 100 to block 300) is made when the following condition is determined;

signal nT reaches threshold value nTlim.

The switch from the third to the first operating mode (from block 300 to block 100) is made when the following condition is determined:

signal pM reaches threshold value pMlim and signal pT does not exceed threshold value pTlim.

The switch from the second to the third operating mode (from block 200 to block 300) is made when the following condition is determined:

signal nT reaches threshold value nTlim.

The switch from the third to the second operating mode (from block 300 to block 200) is made when the following condition is determined:

signal pT reaches threshold value pTlim and signal nT is below threshold value nTlim.

Triggered by above said switching conditions, for any, operating condition of the engine the variable geometry 16 of turbocharger 4 will be commanded by the control mode which suits best to the actual situation. Therefore the system skips automatically within all three modes.

Boost control mode (block 100 in FIG. 2, using controller 41 in FIG. 1) is primarily foreseen to control the variable-geometry turbocharger (4) in engine supply (firing) mode at quasi-steady state operation, with the purpose of establishing engine air supply exactly according to the stored targets. Secondary, it is tasked as boost limiter in retarding (engine braking) mode, with the purpose of preventing excessive engine cylinder pressure.

Preturbine pressure control mode (block 200 in FIG. 2, using controller 43 in FIG. 1) is primarily foreseen to control the variable-geometry turbocharger in retarding (engine braking) mode, with the purpose of establishing exactly the demanded retarding power, whereas in engine supply (firing) mode it is primarily used during transients, where it responses better and faster than the boost control mode. Secondary, it is generally tasked as preturbine pressure limiter.

Turbo speed control mode (block 300 in FIG. 2, using controller 46 in FIG. 1) is primarily foreseen to limit the rotational speed of the variable geometry turbocharger exactly to the manufacturer allowance for safe durability, this in engine supply (firing) and retarding (engine braking) mode. A secondary task is to prevent turbocharger compressor surge.

The system therefore provides for different, automatically selected operating modes of turbocharger 4, which is thus controlled by a system capable of adapting to the instantaneous operating conditions of the engine.

More particularly, the control is switched from one operating mode to another based on explicit switching criteria. The criteria are derivable from operational conditions of the engine and of the turbocharger and the operational conditions are derivable from sensor signals and stored targets.

FIGS. 1a) and 3 show a block diagram and a logic operating diagram of logic circuit 52 by way of an evolution to that in FIG. 2.

Figure 3:
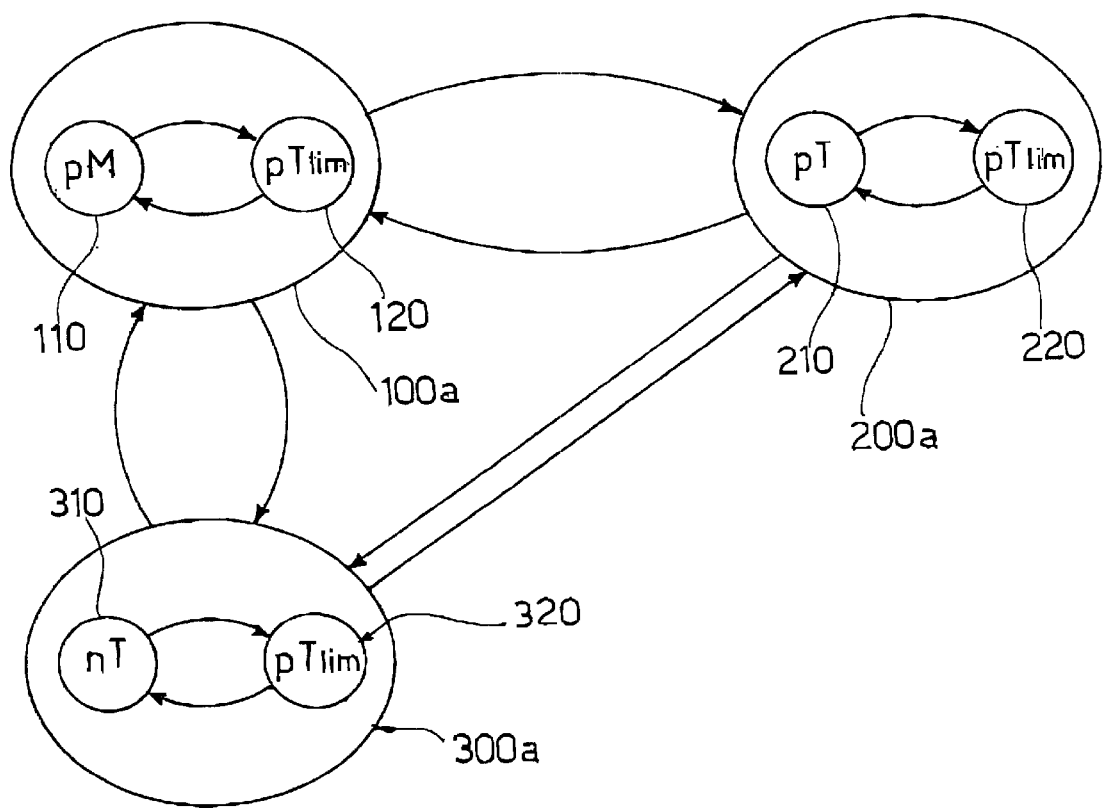
FIG. 3 shows operating stages relative to an evolutive control logic of the system according to the present invention.

In FIG. 3:

block 100a indicates a first operating mode (similar to that described with reference to block 100 of FIG. 2), in which variable-geometry turbocharger 4 is mainly commanded by a boost controller (block 110 in FIG. 3, using controller 41 in FIGS. 1 & 1a), assisted by a preturbine pressure limiter (block 120 in FIG. 3, using controller 41a in FIG. 1a);

block 200a indicates a second operating mode (similar to that described with reference to block 200 of FIG. 2), in which variable-geometry turbocharger 4 is mainly commanded by a preturbine pressure controller (block 210 in FIG. 3, using controller 43 in FIGS. 1 & 1a)), assisted by a preturbine pressure limiter (block 220 in FIG. 3, using controller 43a in FIG. 1a);

block 300a indicates a third operating mode (similar to that described with reference to block 300 of FIG. 2), in which variable-geometry turbocharger 4 is mainly commanded by a turbo speed controller (block 310 in FIG. 3, using controller 46 in FIGS. 1 & 1a)), assisted by a preturbine pressure limiter (block 320 in FIG. 3, using controller 46a in FIG. 1a).

According to the FIGS. 1 and 3 variation, control is switched from one operating mode to another fully automatically.

The switch from the first to the second operating mode (from block 100a to block 200a) is made when the following condition is determined;

the engine is in a transient state and signal nT is below a threshold value nTlim.

The switch from the second to the first operating mode (from block 200a to block 100a) is made when the following condition is determined:

signal pM is close to a reference value pMref and signal nT is below threshold value nTlim.

The switch from the first to the third operating mode (from block 100a to block 300a) is made when the following condition is determined;

signal nT reaches threshold value nTlim.

The switch from the third to the first operating mode (from block 300a to block 100a) is made when the following condition is determined:

signal pM reaches threshold value pMlim and signal pT is below threshold value pTlim.

The switch from the second to the third operating mode (from block 200a to block 300a) is made when the following condition is determined;

signal nT reaches threshold value nTlim.

The switch from the third to the second operating mode (from block 300a to block 200a) is made when the following condition is determined:

signal nT is much lower than threshold value nTlim.

In the FIGS. 1a) and 3 variation, each operating mode (block 100a, 200a and 300a) is of composed type and provides for two alternative sub-operating-modes. That is, when the system is in one of the operating modes described, turbocharger 4 may be controlled alternatively according to a first sub-operating-mode or a second sub-operating-mode. Transition between the three operating modes (between blocks 100a, 200a and 300a) takes precedence over transition between the sub-operating-modes.

More specifically, block 100a comprises:

a block 110 (first sub-operating mode) in which turbocharger 4 is commanded by boost controller 41;

a block 120 (second sub-operating-mode) in which turbocharger 4 is commanded by a preturbine pressure limiter 41a (indicated in FIG. 1a) in order to limit the pressure of the exhaust gas supplied by exhaust manifold 12 to turbine 10.

Transition from block 110 to block 120 occurs when signal pT reaches a limit value and signal pM is below a limit value pMlim; and transition from block 120 to block 110 occurs when signal pM reaches limit value pMlim.

The above transitions are indicated in FIG. 1a by means of a selector D1 activated by logic circuit 52.

Block 200a comprises:

a block 210 (first sub-operating-mode) in which turbocharger 4 is commanded by a preturbine pressure controller 43;

a block 220 (second sub-operating-mode) in which turbocharger 4 is commanded by preturbine pressure limiter 43a (indicated in FIG. 1a) in order to limit the pressure of the exhaust gas supplied by exhaust manifold 12 to turbine 10.

Transition from block 210 to block 220 occurs when signal pT slowly reaches a limit value; and transition from block 220 to block 210 occurs when the error between pTref and pT of controller 43 exceeds a threshold band.

The above transitions are indicated in FIG. 1a by means of a selector D2 activated by logic circuit 52.

Finally, block 300a comprises:

a block 310 (first sub-operating-mode) in which turbocharger 4 is commanded by turbo speed controller 46;

a block 320 (second sub-operating-mode) in which turbocharger 4 is commanded by preturbine pressure limiter 46a (indicated in FIG. 1a) in order to limit the pressure of the exhaust gas supplied by exhaust manifold 12 to turbine 10.

Transition from block 310 to block 320 occurs when signal pT reaches a limit value and signal nT is below limit value nTlim; and transition from block 320 to block 310 occurs when signal nT reaches limit value nTlim.

The above transitions are indicated in FIG. 1a by means of a selector D1 activated by logic circuit 52.

The above transitions are indicated in FIG. 1a by means of a selector D3 activated by logic circuit 52.

Clearly, changes may be made to the system as described herein without, however, departing from the scope of the present invention.

For instance the system of the present invention may also work in a degraded state wherein only two of the three modes 100, 200, 300 or 100a, 200a, 300a provided are used.

What is claimed is:

1. A control system for a variable-geometry turbocharger, wherein an internal combustion engine is connected to a variable-geometry turbocharger (4); said system being characterized by comprising:

a first controller (41) supplying a first drive signal (P1) for controlling (30) the geometry of said turbocharger on the basis of at least a first signal pM correlated to flow of the air supplied to the engine (3) by the compressor (6) of said turbocharger (4);

a second controller (43) supplying a second drive signal (P2) for controlling (30) the geometry of said turbocharger on the basis of a second signal pT correlated to the pressure of the exhaust gas supplied to the turbine (10) of said turbocharger (4);

a third controller (46) supplying a third drive signal (P3) for controlling (30) the geometry of said turbocharger on the basis of a third signal nT correlated to the rotation speed of said turbocharger (4);

said first (41), said second (43) and said third (46) controller providing, in use, for respective first (100; 100a), second (200; 200a) and third (300; 300a) operating modes;

said turbocharger being controlled alternatively by at least two of said controllers (41,43,46) and control being switched automatically from one controller to another respectively from one operating mode to another.

2. A system as claimed in claim 1, characterized in that the control being switched from one operating mode to another based on explicit switching criteria; said criteria being derivable from operational conditions of said engine and of said turbocharger; said operational conditions being derivable from sensor signals and stored targets.

3. A system as claimed in claim 1, characterized in that switching from the first operating mode (100) to the second operating mode (200) occurs when at least one of the following conditions is determined:

the second signal pT reaches a limit threshold value pTlim and the third signal nT does not exceed a limit value nTlim; and the engine is in a transient state and the third signal nT does not exceed a threshold value nTlim.

4. A system as claimed in claim 1, characterized in that switching from the second operating mode (200) to the first operating mode (100) occurs when at least the following condition is determined:

the first signal pM is close to a reference value pMref and the third signal nT does not exceed the threshold value nTlim.

5. A system as claimed in claim 1, characterized in that switching from the first operating mode (100) to the third operating mode (300) occurs when the following condition is determined:

the third signal nT reaches a threshold value nTlim.

6. A system as claimed in claim 1, characterized in that switching from the third operating mode (300) to the first operating mode (100) occurs when the following condition is determined:

the first signal pM reaches a threshold value pMlim and the second signal pT does not exceed a respective threshold value pTlim.

7. A system as claimed in claim 1, characterized in that switching from the second operating mode (200) to the third operating mode (300) occurs when the following condition is determined:

the third signal nT reaches a threshold value nTlim.

8. A system as claimed in claim 1, characterized in that switching from the third operating mode (300) to the second operating mode (200) occurs when the following condition is determined:

the second signal pT reaches a threshold value pTlim and the third signal nT is below the threshold value nTlim.

9. A system as claimed in claim 1, characterized in that each operating mode (100a, 200a, 300a) is of composed type and provides for a first sub-operating-mode (110, 210, 310) of controlling said turbocharger (4), and a second sub-operating-mode (120, 220, 320) of controlling said turbocharger (4); said sub-operating-modes being alternative.

10. A system as claimed in claim 9, characterized in that transition between said operating modes of composed type (100a, 200a, 300a) takes precedence over transition between said sub-operating-modes.

11. A system as claimed in claim 9, characterized in that said first sub-operating-mode provides for control of the turbocharger (4) by said first controller (41) or said second controller (43) or said third controller (46);

said second sub-operating-mode controlling the turbocharger (4) by limiting the pressure of the exhaust gas supplied to the turbine (10) of said turbocharger.

12. System according to claim 9, characterized in that switching from the first operating mode of composed type (100a) to the second operating mode of composed type (200a) occurs when at least the following conditions is determined:

engine is in a transient and the third signal nT is lower than a threshold value nTlim.

13. System according to claim 9, characterized in that switching from the third operating mode of composed type (300a) to the second operating mode of composed type (200a) occurs when at least the following conditions is determined:

third signal nT is much lower than threshold value nTlim.

14. A system as claimed in claim 9, characterized in that said first operating mode (100a) of composed type comprises:

a first sub-operating mode (110) in which turbocharger (4) is controlled by said first controller (41a);

a second sub-operating-mode (120) in which turbocharger (4) is controlled by preturbine pressure limiter (41).

15. A system according to claim 14, characterised in that transition from the first sub-operating mode (110) to the second sub-operating mode (120) occurs when second signal pT reaches a limit value and first signal pM is below a reference value pMref; and transition from the second sub-operating mode (120) to the first sub-operating mode (110) occurs when first signal pM reaches limit value pMlim.

16. A system as claimed in claim 9, characterized in that said second operating mode (200a) of composed type comprises:

a first sub-operating mode (210) in which turbocharger (4) is controlled by said second controller (43);

a second sub-operating-mode (220) in which turbocharger (4) is controlled by preturbine pressure limiter (43a).

17. A system according to claim 16, characterised in that transition from the first sub-operating made (210) to the second sub-operating mode (220)) occurs when the second signal pT slowly reaches a limit value; and transition from the second sub-operating mode (220) to the first sub-operating mode (210) occurs when the error between a reference signal pTref and the second signal pT exceeds a threshold band.

18. A system as claimed in claim 9, characterized in that said third operating mode (300a) of composed type comprises:

a first sub-operating mode (310) in which turbocharger (4) is controlled by said third controller (46);

a second sub-operating-mode (320) in which turbocharger (4) is controlled by preturbine pressure limiter (46a).

19. A system as claimed in claim 18, characterised in that transition from first sub-operating mode (310) to second sub-operating mode (320) occurs when second signal pT reaches a limit value and third signal nT is below limit value nTlim; transition from second sub-operating mode (320) to first sub operating mode (310) occurs when third signal nT reaches limit value nTlim.

* * * * *